United States Patent [19]
Taylor

[11] 3,973,614

[45] Aug. 10, 1976

[54] VEHICLE VALVE-STEM RETAINING DEVICE

[76] Inventor: Gordon Joseph Taylor, 18 Seng St., Graceville, Queensland 4075, Australia

[22] Filed: Apr. 1, 1975

[21] Appl. No.: 564,151

[52] U.S. Cl. ............................................... 152/427
[51] Int. Cl.² ........................................... B60C 29/00
[58] Field of Search .......... 301/5 R, 63 A; 137/223; 152/415, 427–431; 24/248 SL, 259 A

[56] References Cited
UNITED STATES PATENTS

| | | |
|---|---|---|
| 1,600,684 | 9/1926 | McGibbon ........................ 24/259 A |
| 2,937,685 | 5/1960 | Stephens .............................. 152/427 |
| 2,984,283 | 5/1961 | Ravsom .............................. 152/427 |
| 3,018,815 | 1/1962 | Robb et al. ........................... 152/427 |
| 3,064,705 | 11/1962 | Brown et al. ........................ 152/427 |
| 3,077,220 | 2/1963 | Fusco .................................. 152/427 |

*Primary Examiner*—Drayton E. Hoffman
*Attorney, Agent, or Firm*—Haseltine, Lake & Waters

[57] ABSTRACT

A detachable retaining device for a vehicle tire valve stem to prevent withdrawal of the stem within the tire casing includes a widened retaining member, an aperture in the member to accomodate the valve stem, a clamp holding the member laterally on the stem, and a retaining device to prevent longitudinal removal of the member from the stem when clamped.

4 Claims, 3 Drawing Figures

VEHICLE VALVE-STEM RETAINING DEVICE

THE BACKGROUND OF INVENTION

This invention relates to valve stems for heavy vehicle pneumatic tires and particularly those for vehicles having dual wheels.

When a vehicle having dual wheels is driven with one of the dual tires deflated, the casing of the deflated tire, owing to frictional forces, turns slower than its rim. The valve stem is drawn into the tire casing and will damage the casing and its inner tube irreparably in a very short time.

The high cost of heavy tires and the difficulty during travel of detecting deflation of one tire of a dual wheel assembly makes this a serious problem.

BRIEF SUMMARY OF THE INVENTION

An object of this invention is to prevent the valve stem from being drawn into the casing in the above circumstances.

A further object is to provide a simple and cheap attachment to a valve stem for this purpose.

The invention comprises a detachable retaining device for a vehicle tire valve stem including; a retaining member wider than the valve stem; an aperture in said member through which said stem may be passed; clamping means to clamp said member laterally to said stem; and retaining means to prevent longitudinal removal of said member from said stem when so clamped.

Valve stems in heavy vehicles are usually bent at substantially a right angle. In this case, the aperture may be arcuately shaped to fit over the bend of the stem when said member is clamped to the stem to provide said retaining means.

BRIEF DESCRIPTION OF THE DRAWINGS

The drawings show one embodiment of the invention.

DETAILED DESCRIPTION

Figure 2:
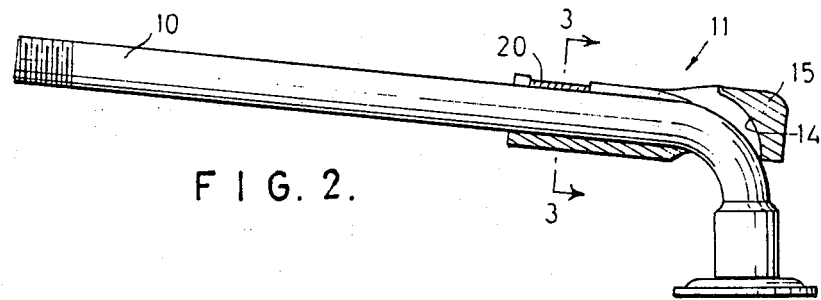
FIG. 2 is a longitudinal section of the arrangement of FIG. 1.

A retaining member 11 wider than stem 10 is moulded of a tough plastic material, such as acetyl resin.

Member 11 has a longitudinal central groove 13 of semi-circular section leading rearwardly to an arcuate aperture 14 through the thickness of member 11. The rear portion 15 of the member 11 serves a flange which overlies the top of aperture 14 and is moulded to give the arcuate form to the aperture.

Figure 3:
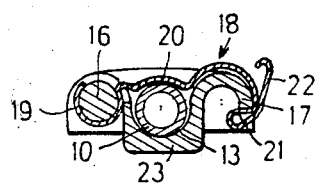
FIG. 3 is a transverse section taken on line 3—3 in FIG. 2.

Member 11 has an integral cylindrical part 16 formed towards one side, lying parallel to groove 13, and a lip 17 at the opposite side (see particularly FIG. 3).

A clip 18 of spring metal, such as stainless steel, has a part circular end 19 which engages over cylindrical part 16 of member 11 to hinge thereon, a central section 20 to bear upon stem 10, a downwardly-curved part 21 to snap over lip 17 of member 11 and an upwardly extending end 22.

Figure 1:
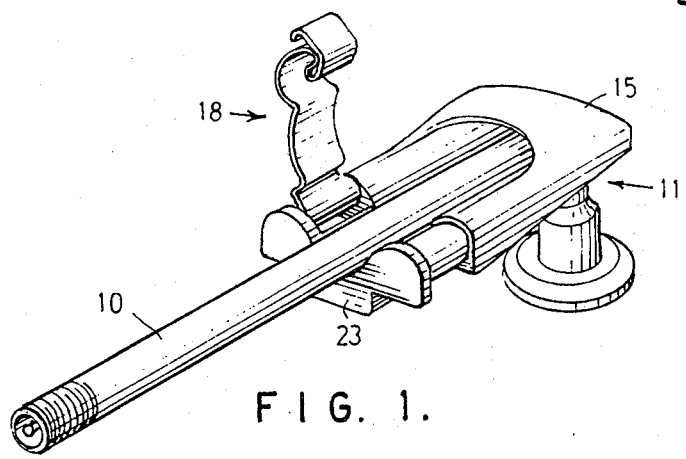
FIG. 1 is a perspective view of a valve stem with the retaining member in place.

In use, stem 10 is passed through aperture 14 and member 11 slid rearwards until the aperture 14 passes over the bend in stem 10. Member 11 is then lifted so that stem 10 lies in groove 13 below the upper face of member 11 and clip 18 is pivoted about part 16 from the open position of FIG. 1 to the "clamp" position of FIGS. 2 and 3 with part 21 sprung around lip 17. Member 11 is therefore securely clamped to stem 10 and cannot be slid forward off the stem because of engagement between the curved aperture 14 and the bend of the stem.

If now the tire becomes deflated, member 11, being too wide to pass through the valve-stem hole in the rim, abuts the rim and prevents the stem from being drawn into the tire to damage it.

Truck rims are usually provided with a valve-stem hole in the form of a slot.

Member 11 may be formed with a rib 23 beneath it, which fits in this slot and prevents angular movement of member 11.

Clip 18 is preferably tightly engaged on lip 17. While it can easily be engaged with lip 17 by pressure, it is difficult to disengage manually. Upwardly extending end 22 enables easy disengagement by inserting a screwdriver between part 21 and part 22 and levering upwards.

I claim:

1. A detachable retainer for a cylindrical vehicle tire valve stem comprising;
    a substantially rectangular plastic retaining member having a thickness greater than the valve stem diameter;
    said retaining member having upper and lower faces and opposite lateral sides,
    said retaining member having a central longitudinal groove exposed at the upper face of said member to accomodate said stem below said upper face;
    said groove extending partially along the length of said retaining member from one end towards the other,
    said retaining member further having an aperture extending through the thickness of said member at the rear of said groove;
    a rear flange on said upper face extending forwardly over said aperture;
    an elongated transverse spring-metal clamp pivoted at one end thereof to one side of said member to lie transversely across said groove to retain said stem therein and a lip on the opposite edge of said member over which the other end of said clamp can be sprung in clamping position.

2. A retainer as claimed in claim 1, including a longitudinal rib on the lower face of said member.

3. A retainer as claimed in claim 1, in which said other end of said clamp has a downwardly hooked part to engage said lip and a reverse upward end extension spaced from said hooked part to allow insertion of a lever between said hooked part and said extension to effect disengagement of said clamp from said lip.

4. A retainer as claimed in claim 3, wherein said member includes a cylindrical part parallel to and to one side of said groove, said one end of said clamp being cylindrical and engaged on said cylindrical part to be pivotal thereon.

* * * * *